United States Patent
Jayaraman et al.

(10) Patent No.: US 9,760,340 B2
(45) Date of Patent: Sep. 12, 2017

(54) METHOD AND SYSTEM FOR ENHANCING QUALITY OF REQUIREMENTS FOR AN APPLICATION DEVELOPMENT

(71) Applicant: Wipro Limited, Bangalore (IN)

(72) Inventors: Venkata Subramanian Jayaraman, Chennai (IN); Sumithra Sundaresan, Chennai (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 14/935,540

(22) Filed: Nov. 9, 2015

(65) Prior Publication Data
US 2017/0031658 A1 Feb. 2, 2017

(30) Foreign Application Priority Data
Jul. 31, 2015 (IN) ............................ 3905/CHE/2015

(51) Int. Cl.
  G06F 9/44 (2006.01)
  G06Q 10/06 (2012.01)
(52) U.S. Cl.
  CPC ............... *G06F 8/10* (2013.01); *G06Q 10/06* (2013.01)
(58) Field of Classification Search
  CPC ....................................................... G06F 8/10
  USPC ....................................................... 717/104
  See application file for complete search history.

(56) References Cited

U.S. PATENT DOCUMENTS

| | | | | |
|---|---|---|---|---|
| 7,035,809 B2* | 4/2006 | Miller | ............ | G06Q 10/06313 705/7.23 |
| 7,137,100 B2* | 11/2006 | Iborra | ...................... | G06F 8/30 717/104 |
| 7,743,365 B2* | 6/2010 | Wehrs | ................... | G06F 9/4411 716/136 |
| 7,752,606 B2* | 7/2010 | Savage | ..................... | G06F 8/20 717/100 |

(Continued)

OTHER PUBLICATIONS

Analysing Security and Software Requirements using Multi-Layered Iterative Model—Sonia, Jyoti Balwani; Department of Computer Science, University of Delhi,India-Archana Singhal; Department of Computer Science, University of Delhi, IP College for Women, India—(IJCSIT) International Journal of Computer Science and Information Technologies 2014.*

*Primary Examiner* — Francisco Aponte
(74) *Attorney, Agent, or Firm* — LeClairRyan, a Professional Corporation

(57) ABSTRACT

The present disclosure relates to a method for enhancing quality of requirements for an application development. The method comprises retrieving expertise information of each user of groups involved in identifying requirements, domain knowledge of each user, information on number of defects associated with requirements and information of requirements for application development from sources. Then, skill score of the groups is computed using expertise information and domain knowledge of each user of corresponding groups. Solidity score of each of requirements is determined using information of requirements and predetermined threshold solidity score. Weightage score of each of requirements is computed based on information of requirements and information on number of defects. The, using skill score of groups, solidity score of each of requirements and weightage score, strength score of each of requirements is computed for enhancing quality of requirements.

18 Claims, 8 Drawing Sheets

(56) References Cited

U.S. PATENT DOCUMENTS

| | | | | |
|---|---|---|---|---|
| 7,908,583 B2* | 3/2011 | Sengupta | G06F 8/10 | 717/101 |
| 8,006,222 B2* | 8/2011 | Ruhe | G06Q 10/10 | 705/12 |
| 8,266,592 B2* | 9/2012 | Beto | G06F 11/3672 | 717/124 |
| 8,271,949 B2* | 9/2012 | Bernardini | G06F 11/3612 | 717/101 |
| 8,312,415 B2* | 11/2012 | Marius | G06F 8/70 | 717/100 |
| 8,375,364 B2 | 2/2013 | Udupa et al. | | |
| 8,448,126 B2* | 5/2013 | Laight | G06Q 10/06 | 705/7.11 |
| 8,694,969 B2* | 4/2014 | Bernardini | G06F 11/3612 | 717/101 |
| 8,776,042 B2* | 7/2014 | Hughes | G06F 8/20 | 717/168 |
| 8,799,044 B2* | 8/2014 | Sudarshan | G06Q 10/067 | 705/7.14 |
| 8,972,938 B2* | 3/2015 | Bnayahu | G06F 8/10 | 455/404.2 |
| 9,292,410 B2* | 3/2016 | Bnayahu | G06F 8/30 | |
| 2007/0074148 A1* | 3/2007 | Morgan | G06Q 10/06 | 717/101 |
| 2007/0220479 A1* | 9/2007 | Hughes | G06Q 30/02 | 717/100 |
| 2007/0240154 A1* | 10/2007 | Gerzymisch | G06F 8/61 | 717/174 |
| 2008/0196000 A1* | 8/2008 | Fernandez-lvern | G06Q 30/02 | 717/101 |
| 2008/0306798 A1* | 12/2008 | Anke | G06F 8/61 | 705/7.26 |
| 2008/0313596 A1* | 12/2008 | Kreamer | G06F 8/20 | 717/101 |
| 2010/0023919 A1* | 1/2010 | Chaar | G06Q 10/06 | 717/101 |
| 2010/0023920 A1* | 1/2010 | Chaar | G06Q 10/06 | 717/102 |
| 2010/0031090 A1* | 2/2010 | Bernardini | G06F 11/366 | 714/38.14 |
| 2010/0031226 A1* | 2/2010 | Chaar | G06Q 10/06 | 717/101 |
| 2010/0031234 A1* | 2/2010 | Chaar | G06F 8/00 | 717/113 |
| 2010/0262471 A1* | 10/2010 | Hughes | G06F 17/50 | 705/7.29 |
| 2012/0102450 A1* | 4/2012 | Choudhary | G06Q 10/06 | 717/101 |
| 2012/0124559 A1* | 5/2012 | Kondur | G09B 7/02 | 717/125 |
| 2013/0185693 A1* | 7/2013 | Chaar | G06Q 10/06 | 717/102 |
| 2014/0007048 A1* | 1/2014 | Qureshi | G06F 21/10 | 717/110 |
| 2014/0096104 A1 | 4/2014 | Novak et al. | | |
| 2016/0048805 A1* | 2/2016 | Blincoe | G06Q 10/101 | 717/102 |

* cited by examiner

| Cost to Fix a defect | | Time Detected | | | | |
|---|---|---|---|---|---|---|
| | | Requirements | Architecture | Construction | System Testing | Post-Release |
| Time introduced | Requirements | 1X | 3X | 5-10X | 10X | 10-100X |
| | Architecture | - | 1X | 10X | 15X | 25-100X |
| | Construction | - | - | 1X | 10X | 10-25X |

| No of Requirements | No of Major Requirements | No of Defects | No of Major Defects | QA Domain Knowledge | QA Skill Level | Dev Domain Knowledge | Dev Skill Level | BA Domain Knowledge | BA Skill Level | Requirements Weightage | Major Requirements Weightage | Composite QA Score | Composite Dev Score | Composite BA Score | Requirements Strength score |
|---|---|---|---|---|---|---|---|---|---|---|---|---|---|---|---|
| 20 | 12 | 2 | 1 | 1 | 3 | 1 | 1 | 1 | 3 | 0.1 | 0.083333333 | 5 | 5 | 5 | 20.28333333 |
| 50 | 35 | 12 | 8 | 2 | 2 | 0 | 2 | 2 | 3 | 0.24 | 0.228571429 | 6 | 6 | 7 | 22.70857143 |
| 100 | 70 | 60 | 40 | 2 | 3 | 2 | 3 | 3 | 3 | 0.6 | 0.571428571 | 7 | 7 | 9 | 33.77142857 |
| 80 | 48 | 30 | 15 | 2 | 2 | 2 | 2 | 2 | 2 | 0.375 | 0.3125 | 6 | 6 | 6 | 25.0625 |
| 120 | 84 | 50 | 35 | 3 | 3 | 3 | 3 | 3 | 3 | 0.416666667 | 0.416666667 | 9 | 9 | 9 | 37.25 |
| 100 | 80 | 5 | 2 | 0 | 1 | 1 | 1 | 1 | 3 | 0.05 | 0.025 | 1 | 1 | 4 | 15.125 |
| 100 | 60 | 8 | 4 | 1 | 3 | 1 | 1 | 1 | 3 | 0.08 | 0.066666667 | 5 | 5 | 5 | 20.22666667 |
| 80 | 60 | 10 | 6 | 1 | 2 | 1 | 2 | 1 | 3 | 0.125 | 0.1 | 3 | 3 | 3 | 18.35 |
| 80 | 60 | 10 | 6 | 1 | 2 | 1 | 2 | 1 | 3 | 0.125 | 0.1 | 3 | 3 | 3 | 18.35 |
| 80 | 60 | 10 | 6 | 1 | 2 | 1 | 2 | 1 | 3 | 0.125 | 0.1 | 4 | 4 | 5 | 18.35 |
| 70 | 55 | 0 | 0 | 3 | 3 | 3 | 3 | 3 | 3 | 0 | 0 | 9 | 9 | 9 | 36 |
| 100 | 70 | 0 | 0 | 0 | 0 | 0 | 0 | 0 | 0 | 0 | 0 | 0 | 0 | 0 | 12 |
| 100 | 70 | 15 | 8 | 2 | 1 | 2 | 1 | 2 | 1 | 0.15 | 0.114285714 | 5 | 6 | 5 | 21.41428571 |
| 100 | 70 | 70 | 65 | 3 | 2 | 3 | 2 | 3 | 3 | 0.7 | 0.928571429 | 8 | 8 | 9 | 36.32857143 |
| 585 | 450 | 160 | 110 | 2 | 3 | 1 | 3 | 2 | 3 | 0.273504274 | 0.244444444 | 7 | 5 | 7 | 26.79145299 |
| 100 | 70 | 20 | 15 | 2 | 2 | 2 | 2 | 2 | 3 | 0.2 | 0.214285714 | 6 | 6 | 3 | 18.61428571 |

| Application | Number of initially approved requirements | Number of modified requirements (added+deleted+updated) | Preconfigured planned solidity score (Initial) | Deviation in solidity score (Current) |
|---|---|---|---|---|
| A | 20 | 10 | 16 | 10 |
| B | 50 | 100 | 40 | -50 |
| C | 100 | 20 | 80 | 80 |
| D | 80 | 30 | 64 | 50 |
| E | 120 | 100 | 96 | 20 |
| F | 100 | 20 | 80 | 80 |
| G | 100 | 30 | 80 | 70 |
| H | 80 | 40 | 64 | 40 |
| I | 80 | 4 | 64 | 76 |

FIGURE 6

| Number of requirements | Number of major requirements | Number of defects | Number of major/critical defects | Weightage score | Weightage score of major requirements |
|---|---|---|---|---|---|
| 20 | 12 | 2 | 1 | 0.1 | 0.83333333 |
| 50 | 35 | 12 | 8 | 0.24 | 0.228571429 |
| 100 | 70 | 60 | 40 | 0.6 | 0.514248571 |
| 80 | 48 | 30 | 15 | 0.375 | 0.3125 |
| 120 | 84 | 50 | 35 | 0.416666667 | 0.4166667 |
| 100 | 80 | 5 | 2 | 0.05 | 0.025 |
| 100 | 60 | 8 | 4 | 0.08 | 0.06666667 |
| 80 | 60 | 10 | 6 | 0.125 | 0.1 |
| 80 | 60 | 10 | 6 | 0.125 | 0.1 |
| 80 | 60 | 10 | 6 | 0.125 | 0.1 |
| 70 | 55 | 0 | 0 | 0 | 0 |
| 100 | 70 | 0 | 0 | 0 | 0 |
| 100 | 70 | 15 | 8 | 0.15 | 0.114285714 |
| 100 | 70 | 70 | 65 | 0.7 | 0.928571429 |
| 585 | 450 | 160 | 110 | 0.273504274 | 0.244444444 |
| 100 | 70 | 20 | 15 | 0.2 | 0.214285714 |

FIGURE 7

METHOD AND SYSTEM FOR ENHANCING QUALITY OF REQUIREMENTS FOR AN APPLICATION DEVELOPMENT

This application claims the benefit of an Indian Patent Application Serial No. 3905/CHE/2015, filed Jul. 31, 2015, which is hereby incorporated by reference in its entirety.

FIELD

The present subject matter is related, in general to requirements for an application development, and more particularly, but not exclusively to a requirement enhancing system and method for enhancing quality of requirements for the application development.

BACKGROUND

Typically, development of an application can be challenging. Many applications are large and the application may require multiple requirements including their features, functionality, and the like. The multiple requirements are necessary to be implemented for the development of the application. For the application development, stability or solidity of each of the requirements is very important. Further, there may be one or more users involved for the application development. The one or more users may include, without limitations, application developers, application designers, application architects, development managers, Quality Analyst (QA), Business Analyst (BA) and any other developer. The one or more users play a vital role in identifying and/or specifying the requirements for the application development.

In one conventional method, quality of the requirements depends on specification of the requirements input by the one or more business users and knowledge in relation to each requirement that the one or more users possess. Particularly, the conventional method lacks in identifying the quality of the requirements depending on corresponding application to be developed.

In one conventional method, the requirements keep changing due to lack of clarity in the specification input by the business users and/or on the knowledge in relation to the requirements for the desired application development. In some scenarios, the requirements are not understandable and the requirements are needed to be specified in detail for the application development. Additionally, in some scenarios, the requirements are specified vaguely and are identified to be not associated for the application development and/or a system on which the application development takes place or a system on which the requirements are implemented. In such a case, the requirements are associated with defects for the corresponding application development. Thus, such are carried through lifetime of the application development till the production of the application. FIG. 1a shows an exemplary diagram illustrating the defects of the requirements that are identified by different one or more users. In the illustrated FIG. 1a, maximum of 73% of defects associated to the requirements are found in a requirement phase which affected in further application development phases. The requirement phase is a phase where the users specify the requirements for the application development. FIG. 1b shows an example of cost involved in fixing the defects at various and different stages of the application development. From the illustrated FIG. 1b, for example, the cost involved in fixing the defects of the requirements during post-release of the application is 10 to 100 times than the cost involved in fixing the defects during the requirement phase. Therefore, the conventional methods fail to detect the defects of the requirements in the requirement phase itself, which results the higher cost involvement for the overall application development. Also, the conventional methods fail to measure the solidity or stability of each of the requirements in the requirement phase. In such a case, the time and cost for using the requirements for the application development is wasted. Further, the conventional methods consumes huge time and cost in correcting the defects of the requirements in various phases of the application development, especially in the requirement phase.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

In one embodiment, the present disclosure relates to a method for enhancing quality of requirements for an application development. The method comprises retrieving at least one of expertise information of each user of one or more groups involved in identifying one or more requirements, domain knowledge of each user, information on number of defects associated with the one or more requirements and information of the one or more requirements for the application development from one or more sources. The method further comprises computing skill score of the one or more groups using at least one of the expertise information and the domain knowledge of each user of corresponding one or more groups. The method further comprises determining solidity score of each of the one or more requirements using at least one of the information of the one or more requirements and a predetermined threshold solidity score. The method further comprises computing weightage score of each of the one or more requirements based on at least one of the information of the one or more requirements and the information on number of defects. The method further comprises computing using at least one of the skill score of the one or more groups, the solidity score of each of the one or more requirements and the weightage score of each of the one or more requirements, strength score of each of the one or more requirements for enhancing the quality of requirements for the application development.

In another embodiment, the present disclosure relates to a requirement enhancing system for enhancing quality of requirements for an application development. The system further comprises a processor and a memory communicatively coupled to the processor, wherein the memory stores processor-executable instructions, which, on execution, cause the processor to perform operations to retrieve at least one of expertise information of each user of one or more groups involved in identifying one or more requirements, domain knowledge of each user, information on number of defects associated with the one or more requirements and information of the one or more requirements for the application development from one or more sources. The processor is further configured to compute skill score of the one or more groups using at least one of the expertise information and the domain knowledge of each user of corresponding one or more groups. The processor is further configured to determine solidity score of each of the one or more requirements using at least one of the information of the one or more requirements and a predetermined threshold solidity score. The processor is further configured to compute weightage score of each of the one or more requirements based on at least one of the information of the one or more requirements and the information on number of defects. The processor is further configured to compute using at least one of the skill score of the one or more groups, the solidity score of each of the one or more requirements and the weightage score of each of the one or more requirements, strength score of each of the one or more requirements for enhancing the quality of requirements for the application development.

In another embodiment, the present disclosure relates to a non-transitory computer readable medium including instructions stored thereon that when processed by at least one processor causes a requirement enhancing system for enhancing quality of requirements for an application development to perform the act of retrieving at least one of expertise information of each user of one or more groups involved in identifying one or more requirements, domain knowledge of each user, information on number of defects associated with the one or more requirements and information of the one or more requirements for the application development from one or more sources. The medium performs computing skill score of the one or more groups using at least one of the expertise information and the domain knowledge of each user of corresponding on one or more groups. The medium further performs determining solidity score of each of the one or more requirements using at least one of the information of the one or more requirements and a predetermined threshold solidity score. The medium is further configured for computing weightage score of each of the one or more requirements based on at least one of the information of the one or more requirements and the information on number of defects. The medium is further configured for computing using at least one of the skill score of the one or more groups, the solidity score of each of the one or more requirements and the weightage score of each of the one or more requirements, strength score of each of the one or more requirements for enhancing the quality of requirements for the application development.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 2 illustrates an exemplary table showing strength score of each requirement for an application development in accordance with some embodiments of the present disclosure;

FIG. 5 shows an exemplary diagram illustrating computation of skill score of one or more groups of users in accordance with some embodiments of the present disclosure;

FIG. 6 shows an exemplary diagram illustrating determining of solidity score of each requirement in accordance with some embodiments of the present disclosure;

FIG. 7 shows an exemplary diagram illustrating computation of weightage score of each requirement in accordance with some embodiments of the present disclosure;

Figures 1A, 1B:
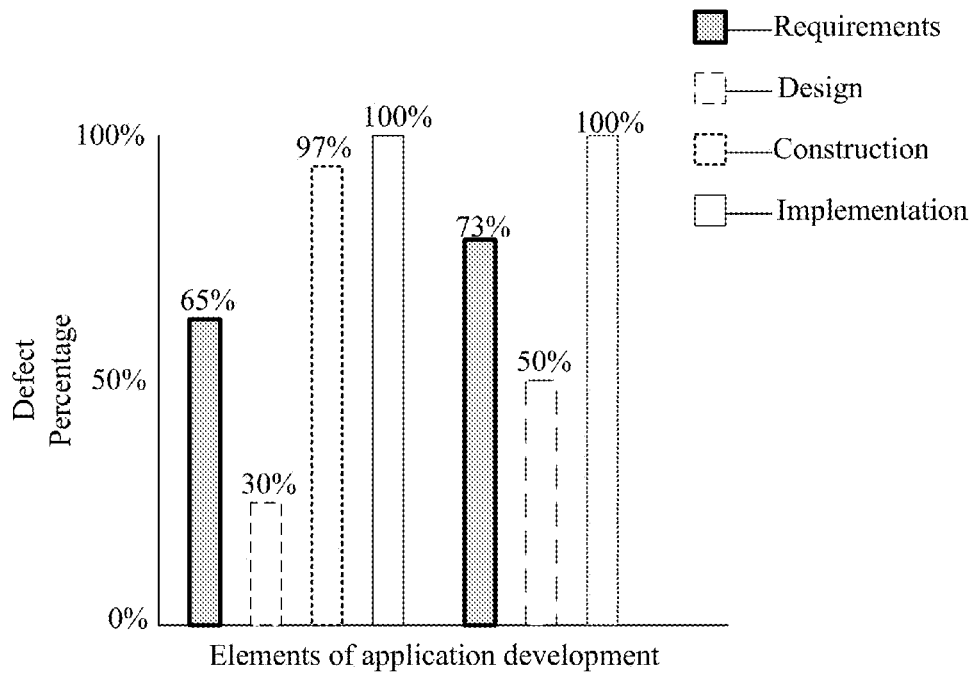
FIGS. 1a and 1b illustrate conventional methods involved in detecting defects of requirements corresponding to an application development.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . , a" does not, without more constraints, preclude the existence of other elements or additional elements in the system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to a method and a requirement enhancing system for enhancing quality of requirements for an application development. Particularly, quality of each requirement is computed based on skills of one or more users associated for the application development and the requirements for the application development and strength scores of each requirement identified for usage for the application development. In such a way, the present disclosure provides an advantage of reducing time consumption and provides cost effective approach for the application development. Such advantage is achieved by determining quality of each requirement in an initial stage of the application development only. Particularly, the initial stage of the application development may be a requirement phase where the requirements are identified for the application development. Further, in such a way, each requirement identified for the application development can be utilized accurately for the application development. Additionally, defects of each requirement are identified in the initial stage of the application development only. In such a way, the application development is not effected by such defective requirements in the initial stage and further stages of the application development as well.

The quality of requirements for the application development is computed from the method that comprises retrieving parameters which include, without limitation, expertise information of each user of one or more groups who are involved in identifying the requirements, domain knowledge of each user, information on number of defects associated with the requirements and information of the requirements for the application development. The user may include, without limitation, Business Analyst (BA), developer (DEV), designers, architects, development managers and Quality Analyst (QA). The expertise information is related to skill level or skill information of each user with respect to each requirement for the corresponding application development. The domain knowledge is related to knowledge of field of each requirement and/or knowledge of corresponding field of the application development. The information of the requirements include, without limitation, number of major requirements, number of critical requirements, number of major defects of each requirement, number of critical defects of each requirement, number of requirement initially approved by each user and/or each group, number of changed requirements, and number of the one or more requirements identified for the application development. The number of changed requirements includes, without limitation, added requirements for the application development, and deleted requirements from the application development. Using the parameters, skill score of each group, solidity score of each requirement, weightage score of each requirement including weightage score of critical and noncritical requirements are computed. Then, using the skill score and/or the solidity score and/or the weightage score, strength score of each requirement is computed which in turn enhances the quality of each requirement for the application development. FIG. 2 shows an exemplary table where the skill scores, the weightage score and the strength score of each requirement is computed. The method further includes providing an alert when the skill score is not matching a threshold skill score and/or when the solidity score deviates from threshold solidity score and/or when the strength score is not matching threshold strength score. In the illustrated FIG. 2, the skill score, the solidity score, and the strength score attained not matching the threshold skill score, the threshold solidity score and the threshold strength score respectively are shown as highlighted.

Figure 3:
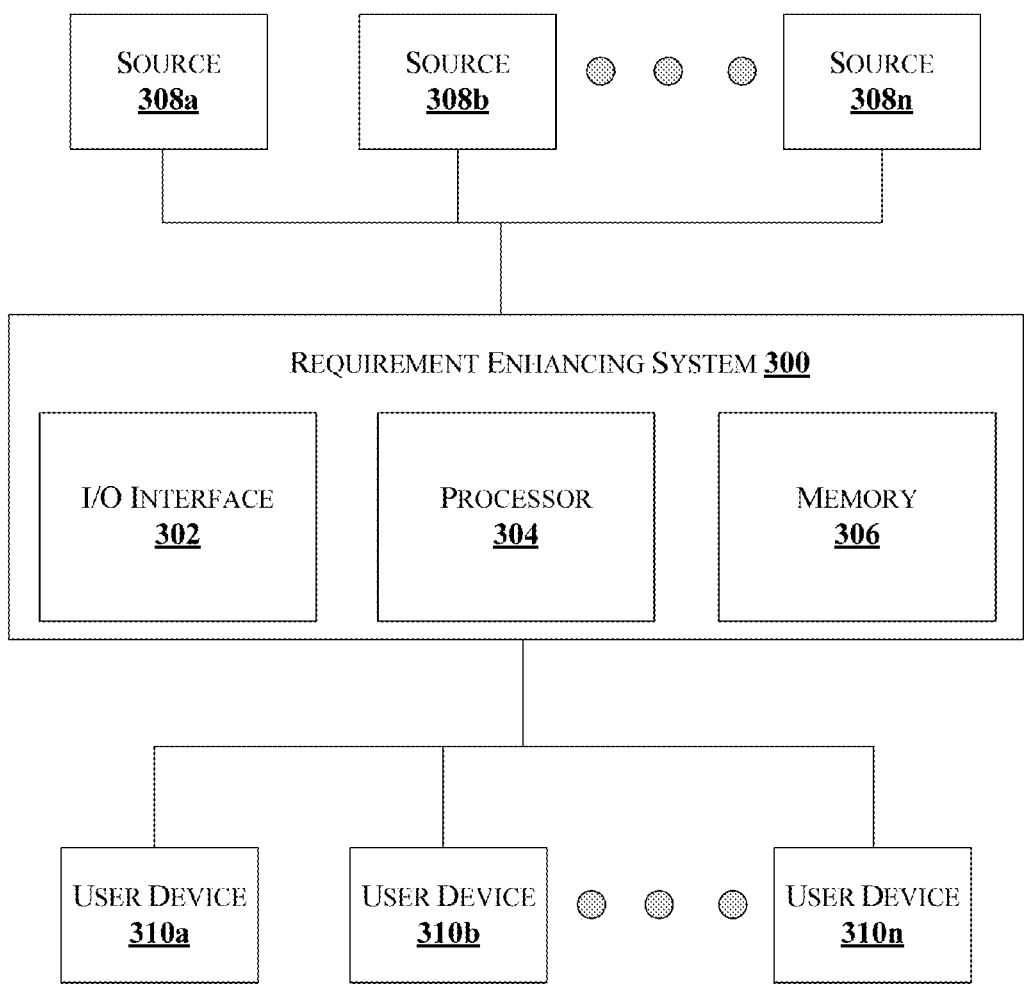
FIG. 3 illustrates an exemplary embodiment of environment for enhancing quality of each requirement for an application development in accordance with some embodiments of the present disclosure.

FIG. 3 illustrates an exemplary embodiment of environment for enhancing quality of requirements for an application development in accordance with some embodiments of the present disclosure.

The environment comprises a requirement enhancing system 300, one or more sources 308a, 308b, . . . , 308n (collectively referred to 308) and one or more user devices 310a, 310b, . . . , 310n (collectively referred to 310). In one implementation, the requirement enhancing system 300 may be implemented in a variety of computing systems, such as a laptop computer, a desktop computer, a Personal Computer (PC), a notebook, a smartphone, a tablet, e-book readers (e.g., Kindles and Nooks), a node in a network, a server, a network server, and the like. In one example, the requirement enhancing system 300 is configured to enhance quality of requirements for the application development. The components of the requirement enhancing system 300 are explained in detail below sections of the description.

In an embodiment, the requirement enhancing system 300 is communicatively connected to one or more sources 308 and one or more user devices 310 over a network. The one or more sources 308 refers to databases which include, but are not limited to, database storing the one or more requirements for a desired application development, database storing information on defects associated with the one or more requirements, database related to storing major requirements, critical requirements, and noncritical requirements for a particular application development, information on requirements been added for the application development, information on requirements been deleted, and information related to the requirements been changed for the application, database related to storing information related to the application to be developed, database storing domain knowledge of each user with respect to field of the one or more requirements and/or field of the application development, database storing information on skills and expertise information of each user associated with the one or more requirements and/or the application development. In an embodiment, the one or more sources 308 may be associated with the requirement enhancing system 300 and/or may be third party sources.

The one or more user devices 310 are associated to the one or more users involved for the application development. The one or more user devices 310 include, but are not limited to, computing systems, such as a laptop computer, a desktop computer, a Personal Computer (PC), a notebook, a smartphone, a smartwatch, a wearable device, a tablet, e-book readers (e.g., Kindles and Nooks). In an embodiment, the one or more user devices 310 can act as the requirement enhancing system 300 and vice versa. Each user device of the one or more user devices 310 comprises a display unit (not shown) where resulted measures on the quality of the requirements can be reviewed by the one or more users. In an embodiment, the one or more users use the one or more user devices for identifying the one or more requirements for the corresponding application development. The one or more users can specify the one or more requirements along with a selection of the particular application to be developed, which are received by the requirement enhancing system 300.

In the illustrated FIG. 3, the requirement enhancing system 300 comprises an I/O interface 302, a central processing unit ("CPU" or "processor") 304 having one or more processing units, and a memory 306 in accordance with some embodiments of the present disclosure.

The I/O interface 302 is a medium through which one or more parameters associated with the one or more requirements, the one or more users involved for the application development and the application to be developed are retrieved from the one or more sources 308. The I/O interface 302 is configured to provide strength score of each requirement of the one or more requirement for the application development to the display unit of the requirement enhancing system 300 and/or the one or more user devices 310. In an embodiment, the I/O interface 302 provides an alert to the display unit. The alert is provided based on comparison of skill scores of each group of users, and/or solidity score of each requirement and/or the strength score of each requirement with respective threshold scores. The I/O interface 302 is coupled with the processor 304. The processor 304 is configured to compute quality of each requirement of the one or more requirements for the desired application development.

The processor 304 may comprise at least one data processor for executing program components for processing system-identified one or more requirements for the application development. The processor 304 is configured to compute the skill score of each group of users using the one or more parameters. In an embodiment, the processor 304 compares the computed skill score with a predetermined threshold skill score and/or generates an alert based on the comparison of the skill score with the predetermined threshold skill score. The processor 304 determines solidity score of each requirement of the one or more requirements using the one or more parameters and a predetermined threshold solidity score. In an embodiment, the processor 304 identifies deviation of the solidity score with respect to a preconfigured planned solidity score. Further, the processor 304 generates an alert based on the identification of the deviation. The processor 304 computes weightage score and strength score of each requirement of the one or more requirements using the one or more parameters and the skill score, the solidity score and the weightage score respectively. In an embodiment, the processor 304 computes critical requirements weightage score and noncritical requirements weightage score. In such a way of computation, the quality of each requirement of the one or more requirements is enhanced for the application development. In an embodiment, the processor 304 compares the computed strength score with a predetermined threshold strength score and/or generates an alert based on the comparison of the strength score with the predetermined threshold strength score. Various functionalities performed by the processor 304 are achieved using one or more modules that are stored in the memory 306 which are explained in below description.

The memory 306 stores instructions which are executable by the at least one processor 304. In an embodiment, the memory 306 stores requirements data, data of application development, user related data, domain information, and predetermined threshold scores data. In an embodiment, the requirements data, the data of application development, the user related data, the domain information, and the predetermined threshold scores data are stored as one or more data required for enhancing the quality of each requirement of the one or more requirements for the application development as described in the following description of the disclosure.

Figure 4:
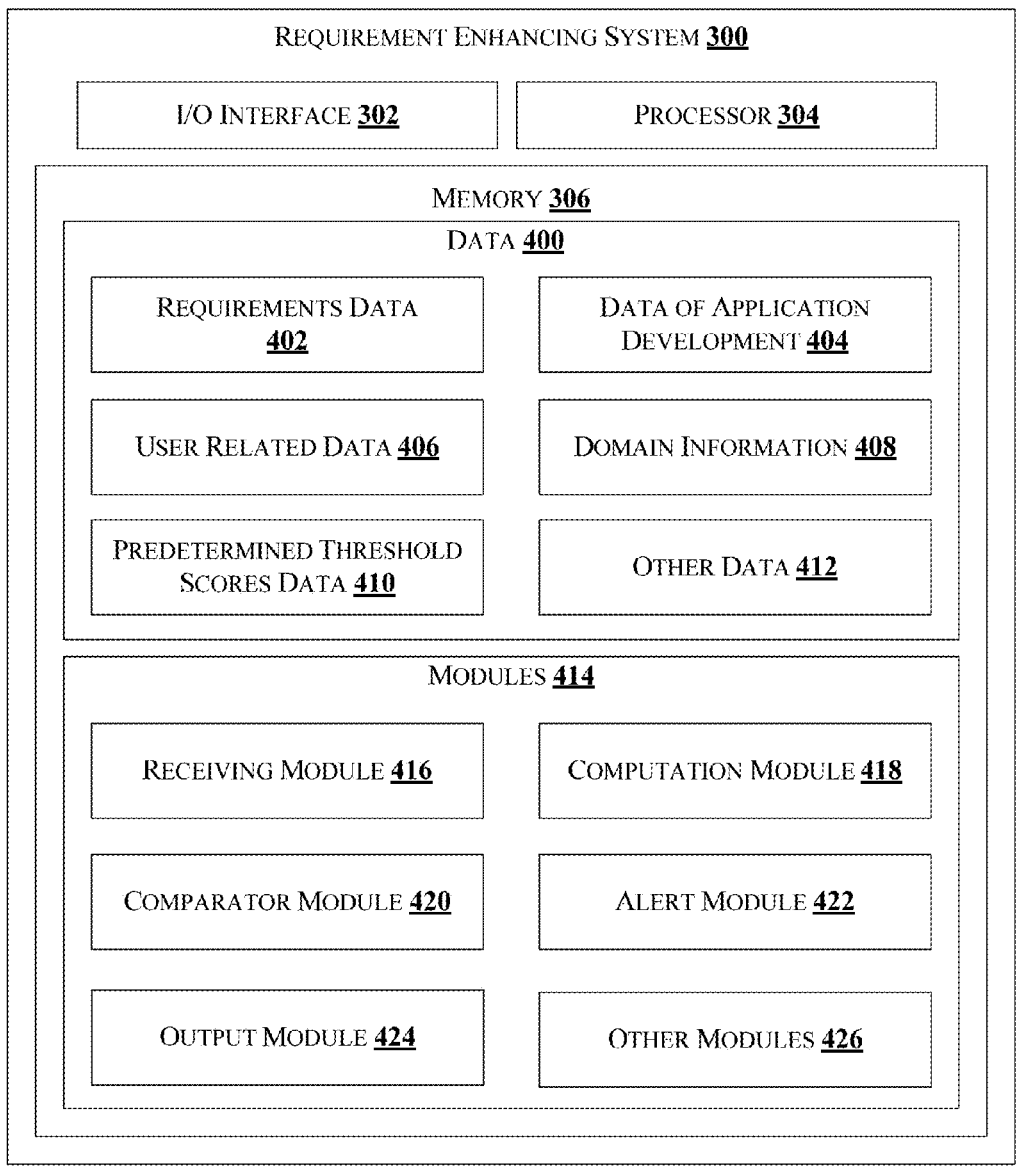
FIG. 4 illustrates a block diagram of an exemplary requirement enhancing system with various data and modules for enhancing quality of each requirement for an application development in accordance with some embodiments of the present disclosure.

FIG. 4 illustrates a block diagram of the exemplary requirement enhancing system 300 with various data and modules for enhancing the quality of each requirement of the one or more requirements for the application development in accordance with some embodiments of the present disclosure. In the illustrated FIG. 4, the one or more data 400 and the one or more modules 414 stored in the memory 306 are described herein in detail.

In an embodiment, the one or more data 400 may include, for example, the requirements data 402, the data of application development 404, the user related data 406, the domain information 408, and the predetermined threshold scores data 410, and other data 412 for enhancing the quality of each requirement of the one or more requirements for the application development.

The requirements data 402 refers to information of the one or more requirements and/or defects information relate to the one or more requirements. The information of the one or more requirements include, without limitations, major requirements, critical requirements, requirements that are initially approved by each user, changed requirements and the one or more requirements that identified for the application development. The information of the one or more requirements maintains number of major requirements, number of critical requirements, number of requirement initially approved, number of changed requirements and number of the one or more requirements identified by each user for the application development. The changed requirements are the requirements that are modified by a requirement management tool (not shown) of the requirement enhancing system 300 and/or the one or more user devices 310 and/or any other device. The changed requirements include, without limitations, added requirements to the application development, deleted requirements from the application development, and updated requirements. The requirements data 402 contains information on complexities of each requirement corresponding to the application development. The defect information refers to defects associated with the one or more requirements. The defect information contains number of defects per application development along severity of each defect. Further, the defect information contains critical defects and major defects.

The data of application development 404 refers to information of application to be developed. The information of the application to be developed may include, without limitations, kind of the application development, prominence of the application development and the like.

The user related data 406 contains skill information and expertise information of each user in one or more groups with respect to the one or more requirements specified for the application development. For example, the skill information and the expertise information of a Business Analyst (BA), the Quality Analyst (QA) and the developer are contained in the user related data 406.

The domain information 408 contains domain knowledge of each user in the one or more groups on field of each requirement of the one or more requirements and/or field of the application development.

The predetermined threshold scores data 410 contains a predetermined threshold skill score of each group of users involved in the application development, a predetermined threshold solidity score of each requirement of the one or more requirements, and a predetermined threshold strength score of each requirement of the one or more requirements. Further, the predetermined threshold scores data 410 contains preconfigured planned solidity score of the one or more requirements.

The other data 412 may refer to such data which can be referred for enhancing the quality of each requirement of the one or more requirements for the application development.

In an embodiment, the one or more data 400 in the memory 306 are processed by the one or more modules 414 of the requirement enhancing system 300. The one or more modules 400 may be stored within the memory 306 as shown in FIG. 4. In an example, the one or more modules 414, communicatively coupled to the processor 304, may also be present outside the memory 306 and implemented as hardware. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

In one implementation, the one or more modules 414 may include, for example, a receiving module 416, a computation module 418, a comparator module 420, an alert module 422, and an output module 424. The memory 306 may also comprise other modules 426 to perform various miscellaneous functionalities of the requirement enhancing system 300. It will be appreciated that such aforementioned modules may be represented as a single module or a combination of different modules.

The receiving module 416 retrieves the one or more parameters from the one or more sources 308. The one or more parameters include, but are not limited to, expertise information of each user of the one or more groups involved in identifying the one or more requirements, the domain knowledge of each user, the information on number of defects associated with the one or more requirements and information of the one or more requirements for the application development. The receiving module 416 retrieves information on the number of the major requirements and/or the critical requirements, the number of requirements initially approved, the number of changed requirements and the number of the one or more requirements. In an embodiment, the receiving module 416 retrieves the one or more parameters using the one or more data 400. For example, the one or more parameters are retrieved when the one or more users of the one or more groups specifies information, for example the one or more requirement, user information, etc. relevant to the application development. Then, based on the specified information overall domain knowledge of each user and overall skill level of each user are retrieved. Next, based on the specified information, total number of the one or more requirements which have been changed and/or deleted and/or added and/or modified during requirement phase are retrieved.

The computation module 418 computes skill score of the one or more groups using the expertise information, the skill information and the domain knowledge of each user of the corresponding one or more groups. In an embodiment, computation module 418 comprises a skill analyzer (not shown) which receives the skill information and the domain knowledge of each user of the one or more groups. Then, the skill analyzer determines the overall skill level of the different users involved in the requirement phase, for example BA, the QA and the developer (DEV). The computation module 418 computes composite skill score and/or knowledge level score of each user as below:

$$\text{Composite skill score} = `X_1` \text{ times the value of domain knowledge} + `Y_1` \text{ time the value of Skill} \quad (1)$$

The '$X_1$' and the '$Y_1$' are the reference values set for computing the skill score of each of the one or more groups. FIG. 5 shows an exemplary diagram illustrating skill scores of each of the user.

In an embodiment, the comparator module 420 compares the composite skill score with the predetermined threshold skill score. For example, the knowledge score of the team or group is compared with the predetermined threshold skill score '$V_1$'. Then, based on the comparison, an alert is provided to each user through the one or more user devices 310 by the alert module 424. For example, consider the predetermined threshold skill score $V_1$ is 4. If the knowledge level of the BA or QA is less than '$V_1$' then an alert is provided to a business team and/or or User Acceptance Testing (UAT) team for reviewing the overall requirement process. If the knowledge level of the development team is less than then an alert is provided to the architects. The alert is provided to the display unit of the requirement enhancing system 300 and/or the one or more user devices 310 by the alert module 424 through the output module 426.

The computation module 418 determines solidity score of each of the one or more requirements using the information of the one or more requirements and/or the predetermined threshold solidity score. Particularly, upon computing the composite skill score using equation (1) then the information of the one or more requirements is provided to a requirements stabilizer module of the computation module 418. The requirement solidity module is ascertained to ensure that the requirements are solid enough to proceed further for the application development. The overall requirement solidity is determined as:

$$\text{Requirement Solidity} = \text{Initial approved requirements} - (\text{Total changes in requirements} * V_2) \quad (2)$$

Where '$V_2$' is the predetermined threshold solidity score. In an embodiment, the solidity score of each of the one or more requirements is determined based on the number of requirements initially approved, the number of the changed requirements and the predetermined threshold solidity score '$V_2$'. FIG. 6 shows the illustration on the computation of the solidity score of each of the one or more requirements.

In an embodiment, the comparator module 420 compares a current solidity score with the preconfigured planned solidity score. For example, the comparator module 420 checks if the deviation between the preconfigured planned solidity score and the currently determined solidity score is more. In such a case, the requirement is considered to be not stable enough. Then, an alert is provided to the corresponding groups through the alert module 422 and the output module 424. The illustrated FIG. 6 shows the deviation of the solidity score by considering the preconfigured planned solidity score '$V_2$' of 0.2 units.

The computation score 418 computes weightage score of each of the one or more requirements based on the information of the one or more requirements and the information on number of defects. The weightage score of each of the one or more requirements is computed based on the number of the one or more requirements and the information on number of defects corresponding to the one or more requirements. In an embodiment, upon determining the composite skill score and the solidity score, the weightage score of each of the one or more requirements are determined based on the defects of the application of previous release. From the total number of defects, the critical requirement weightage score, major requirements weightage score and noncritical weightage score are identified. FIG. 7 shows the computation of the weightage score of the one or more requirements. The weightage score of each of the one or more requirements is computed as below:

$$\text{Requirement Weightage} = \text{Total requirements}/\text{Total defects on those requirements} \quad (3)$$

The critical requirements weightage score is computed based on number of the critical requirements of the one or more requirements and information on number of defects of the corresponding one or more requirements. The critical requirement weightage score is computed as below:

$$\text{Critical Requirement Weightage score} = \text{Total critical or major requirements}/\text{Total defects on the requirements} \quad (4)$$

The computation module 418 computes strength score of each of the one or more requirements using the skill score of the one or more groups, the solidity score of each of the one or more requirements and the weightage score of each of the one or more requirements. The strength score is computed as below:

$$\text{Total strength score} = \text{Weightage score} + (X_2 * \text{Weighted score of Critical requirements}) + \text{Composite } QA \text{ score} + \text{Composite } AD \text{ score} + (Y_2 * \text{composite } BA \text{ score}) \quad (5)$$

The '$X_2$' and '$Y_2$' are reference values preset for computing the strength score.

The comparator module 420 compares the strength score with the predetermined strength score. For example, if the strength score is more than the predetermined strength score then the quality of the one or more requirements is enhanced for the application development. FIG. 2 shows an exemplary diagram illustrating the computation of the strength score of each of the one or more requirements where the predetermined threshold strength score '$V_3$' is 18. For example, if the total strength score is below the predetermined threshold strength score say '$V_3$' then re-review process or revalidation process or changing personnel are to be performed to ensure the stability of the application development.

In an embodiment, an alert is provided to the display unit based on the comparison by the alert module 422 through the output module 424.

Figure 8:
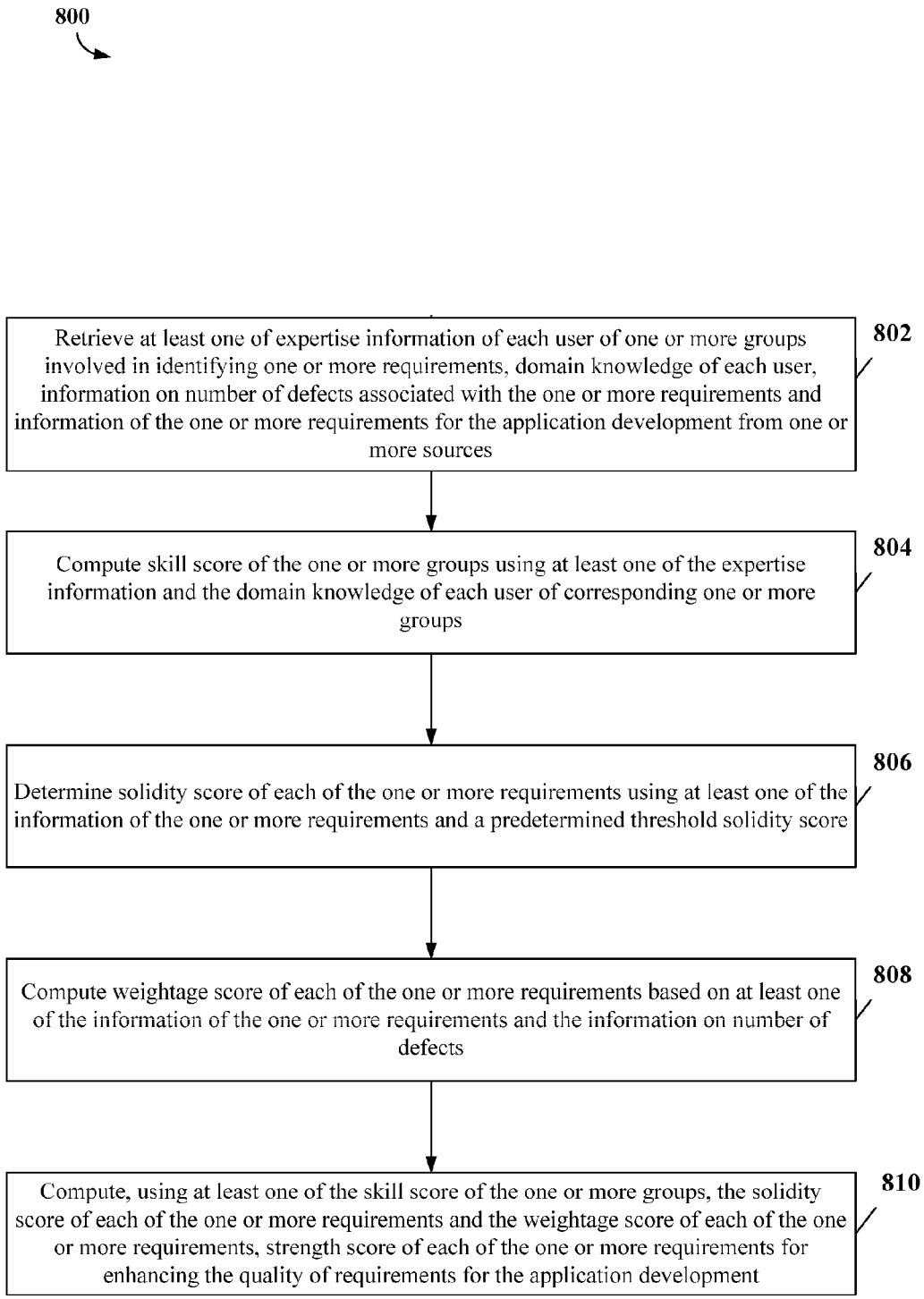
FIG. 8 shows a flowchart illustrating a method for enhancing quality of requirements for an application development in accordance with some embodiments of the present disclosure.

FIG. 8 shows a flowchart illustrating a method 800 for enhancing the quality of each requirement of the one or more requirements in accordance with some embodiments of the present disclosure.

As illustrated in FIG. 8, the method comprises one or more blocks for enhancing the quality of the requirements. The method 800 may be described in the general context of computer executable instructions. Generally, computer executable instructions can include routines, programs, objects, components, data structures, procedures, modules, and functions, which perform particular functions or implement particular abstract data types.

The order in which the method 800 is described is not intended to be construed as a limitation, and any number of the described method blocks can be combined in any order to implement the method. Additionally, individual blocks may be deleted from the methods without departing from the scope of the subject matter described herein. Furthermore, the method 800 can be implemented in any suitable hardware, software, firmware, or combination thereof.

At block 802, at least one of expertise information of each user of the one or more groups involved in identifying the one or more requirements, the domain knowledge of each user, the information on number of defects associated with the one or more requirements and the information of the one or more requirements for the application development are retrieved from one or more sources. In an embodiment, the information of the one or more requirements comprises the number of at least one of major requirements and critical requirements, the number of requirements initially approved, the number of changed requirements and the number of the one or more requirements.

At block 804, the skill score of the one or more groups is computed using the expertise information and the domain knowledge of each user of the corresponding one or more groups. In an embodiment, the computed skill score of the one or more groups is compared with the predetermined skill score. In an embodiment, an alert to the display unit is provided based on the comparison.

At block 806, the solidity score of each of the one or more requirements is determined using the information of the one or more requirements and a predetermined threshold solidity score. In an embodiment, the solidity score of each of the one or more requirements is determined based on the number of requirements initially approved, the number of the changed requirements and the predetermined threshold solidity score. In an embodiment, the deviation of the solidity score with respect to the preconfigured planned solidity score identified. Based on the identification of the deviation, an alert is provided to the display unit.

At block 808, the weightage score of each of the one or more requirements is computed based on the information of the one or more requirements and the information on number of defects. In an embodiment, the weightage score of each of the one or more requirements is computed based on the number of the one or more requirements and the information on number of defects corresponding to the one or more requirements. In an embodiment, the method computes the critical requirements weightage score and the noncritical requirements weightage score as well. The critical requirements weightage score is computed based on the critical requirements of the one or more requirements and information on number of defects of the corresponding one or more requirements.

At block 810, using the skill score of the one or more groups, the solidity score of each of the one or more requirements and the weightage score of each of the one or more requirements, the strength score of each of the one or more requirements is computed for enhancing the quality of requirements for the application development. In an embodiment, the strength score of each of the one or more requirements is compared with the predetermined threshold strength score. Based on the comparison an alert is provided to the display unit.

Computer System

Figure 9:
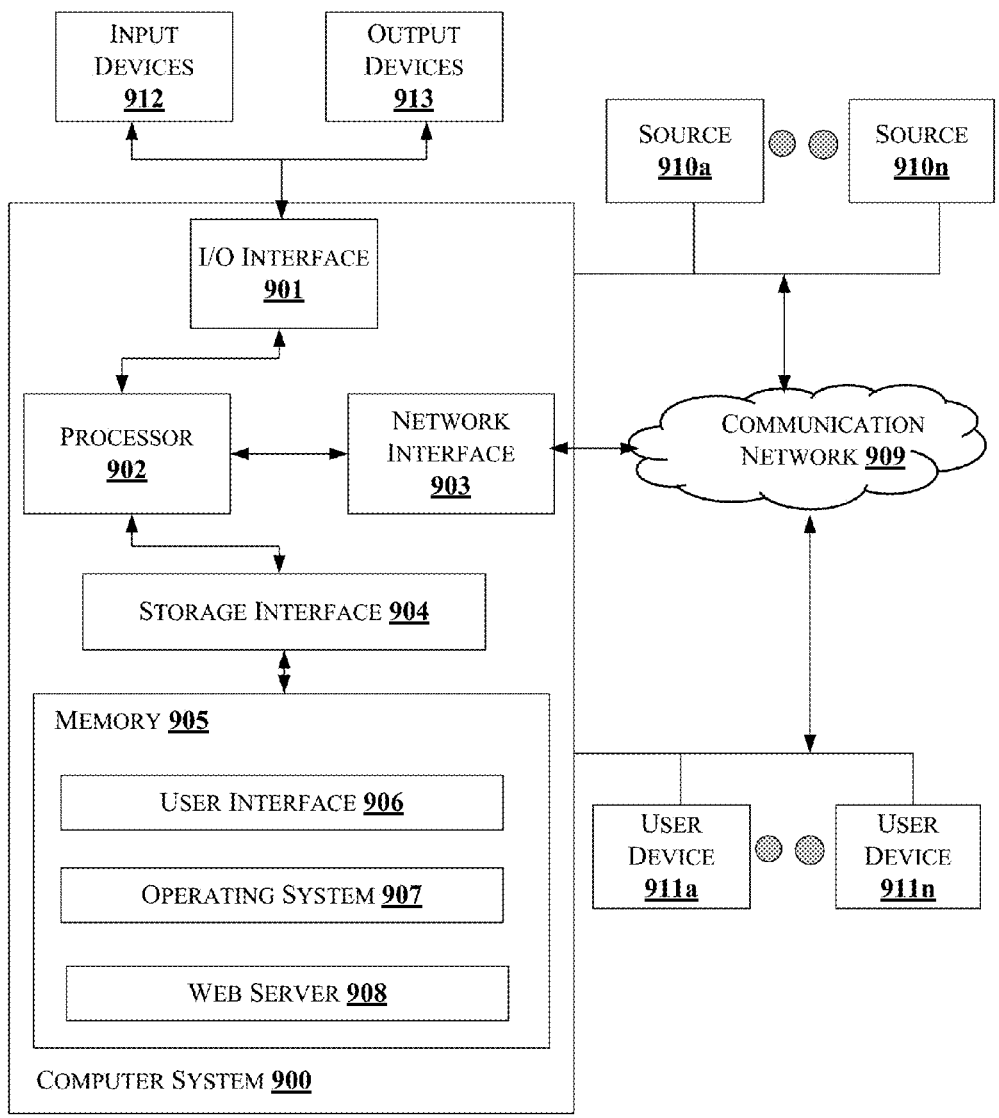
FIG. 9 is a block diagram of an exemplary computer system for implementing embodiments consistent with the present disclosure.

FIG. 9 illustrates a block diagram of an exemplary computer system 900 for implementing embodiments consistent with the present disclosure. In an embodiment, the computer system 900 is used to implement the requirement enhancing system 300. The computer system 900 may comprise a central processing unit ("CPU" or "processor") 902. The processor 902 may comprise at least one data processor for executing program components for executing system-identified requirements for the application development. The processor 902 may include specialized processing units such as integrated system (bus) controllers, memory management control units, floating point units, graphics processing units, digital signal processing units, etc.

The processor 902 may be disposed in communication with one or more input/output (I/O) devices (not shown) via I/O interface 901. The I/O interface 901 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 901, the computer system 900 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 900 is connected to the one or more user devices 911a, . . . , 911n, and the one or more sources 910a, . . . , 910n through a communication network 909. The processor 902 may be disposed in communication with the communication network 909 via a network interface 903. The network interface 903 may communicate with the communication network 909. The network interface 903 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 909 may include, without limitation, a direct interconnection, local area network (LAN), wide area network (WAN), wireless network (e.g., using Wireless Application Protocol), the Internet, etc. Using the network interface 903 and the communication network 909, the computer system 900 may communicate with the one or more user devices 911a, . . . , 911n, and the one or more servers 910a, . . . , 910n. The network interface 903 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 909 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The communication network 909 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 909 may include a variety of network devices, including routers, bridges, servers, computing devices, storage devices, etc.

In some embodiments, the processor 902 may be disposed in communication with a memory 1005 (e.g., RAM, ROM, etc. not shown in FIG. 9) via a storage interface 904. The storage interface 904 may connect to memory 905 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 905 may store a collection of program or database components, including, without limitation, user interface 906, an operating system 907, web server 908 etc. In some embodiments, computer system 900 may store user/application data 906, such as the data, variables, records, etc. as described in this disclosure. Such databases may be implemented as fault-tolerant, relational, scalable, secure databases such as Oracle or Sybase.

The operating system 907 may facilitate resource management and operation of the computer system 900. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like.

In some embodiments, the computer system 900 may implement a web browser 907 stored program component. The web browser 908 may be a hypertext viewing application, such as Microsoft Internet Explorer, Google Chrome, Mozilla Firefox, Apple Safari, etc. Secure web browsing may be provided using Secure Hypertext Transport Protocol (HTTPS), Secure Sockets Layer (SSL), Transport Layer Security (TLS), etc. Web browsers 908 may utilize facilities such as AJAX, DHTML, Adobe Flash, JavaScript, Java, Application Programming Interfaces (APIs), etc. In some embodiments, the computer system 900 may implement a mail server stored program component. The mail server may be an Internet mail server such as Microsoft Exchange, or the like. The mail server may utilize facilities such as ASP, ActiveX, ANSI C++/C#, Microsoft.NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 900 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, nonvolatile memory, hard drives, CD ROMs, DVDs, flash drives, disks, and any other known physical storage media.

Advantages of the embodiment of the present disclosure are illustrated herein.

Embodiments of the present disclosure improve detection of accurate requirements depending on the desired application development, skill score of each group involved in the application development and the system used for the application development.

Embodiments of the present disclosure reduce time and cost for the application development by determining the quality of each requirement with respect to the application development in requirement phase itself. In particular, the requirement phase may an identification stage corresponding to identifying the requirements for the application development. In such a way, the requirements corresponding to the desired application development can be used accurately for the application development. Further, in such a way, defects to be occurring in various further stages of the application development can be detected in the requirement phase itself, thus saving time and cost for the application development.

Embodiments of the present disclosure detect defects of the requirements in the requirement phase itself to avoid excessive time consumption and cost involved in various stages of the application development.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the technology" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the technology.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the technology need not include the device itself.

The illustrated operations of FIG. 8 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the technology is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for enhancing quality of requirements to improve computer application development implemented by one or more requirement enhancing computing devices, the method comprising:

retrieving at least one of expertise data for each of a plurality of users of one or more groups of users involved in identifying one or more requirements of a development of a computer application, domain knowledge of each of the users, a number of defects associated with the requirements, and data of the requirements from one or more source database devices;

computing a skill score of each of the groups using at least one of the expertise data and the domain knowledge of each of the users of a corresponding one or more of the groups;

determining a solidity score of each of the requirements using at least one of the data of the requirements and a predetermined threshold solidity score;

computing a weightage score of each of the requirements based on at least one of the data of the requirements and the data on the number of defects;

computing a strength score of each of the requirements using at least one of the skill score of each of the groups, the solidity score of each of the requirements, and the weightage score of each of the requirements;

determining when the strength score for one or more of the requirements exceeds a predetermined threshold strength score; and outputting an alert to a display device when the determining indicates that the strength score for the one or more of the requirements exceeds the predetermined threshold strength score.

2. The method as claimed in claim 1, wherein the data of the requirements comprises at least one of a number of at least one of major requirements or critical requirements, number of requirements initially approved, number of changed requirements, and number of the requirements.

3. The method as claimed in claim 1 further comprising:
performing at least one of comparing the computed skill score of the one or more groups with a predetermined skill score; and
providing an alert to a display unit associated with the requirement enhancing system based on the comparison.

4. The method as claimed in claim 2, wherein:
the solidity score of each of the requirements is determined based on at least one of the number of requirements initially approved, the number of the changed requirements, and the predetermined threshold solidity score; or
the weightage score of each of the requirements is computed based on at least one of the number of the requirements and the data on number of defects corresponding to the requirements.

5. The method as claimed in claim 1 further comprising:
performing at least one of identifying a deviation of the solidity score with respect to a preconfigured planned solidity score; and
providing an alert to a display unit based on the identification of the deviation.

6. The method as claimed in claim 1, wherein computing the weightage score of each of the requirements comprises computing at least one of a critical requirements weightage score and a noncritical requirements weightage score, wherein the critical requirements weightage score is computed based on at least one of a number of the critical requirements of the requirements and the number of defects of the corresponding requirements.

7. A requirement enhancing computing device comprising at least one processor and a memory comprising programmed instructions stored thereon, the memory coupled to the processor which is configured to be capable of executing the stored programmed instructions to:

retrieve at least one of expertise data for each of a plurality of users of one or more groups of users involved in identifying one or more requirements of a development of a computer application, domain knowledge of each of the users, a number of defects associated with the requirements, and data of the requirements from one or more source database devices;

compute a skill score of each of the groups using at least one of the expertise data and the domain knowledge of each of the users of a corresponding one or more of the groups;

determine a solidity score of each of the requirements using at least one of the data of the requirements and a predetermined threshold solidity score;

compute a weightage score of each of the requirements based on at least one of the data of the requirements and the data on the number of defects;

compute a strength score of each of the requirements using at least one of the skill score of each of the groups, the solidity score of each of the requirements, and the weightage score of each of the requirements;

determine when the strength score for one or more of the requirements exceeds a predetermined threshold strength score; and output an alert to a display device when the determining indicates that the strength score for the one or more of the requirements exceeds the predetermined threshold strength score.

8. The requirement enhancing computing device as claimed in claim 7, wherein the data of the requirements comprises at least one of a number of at least one of major requirements or critical requirements, number of requirements initially approved, number of changed requirements, and number of the requirements.

9. The requirement enhancing computing device as claimed in claim 7, wherein the processor is further configured to be capable of executing the stored programmed instructions to:
perform at least one of comparing the computed skill score of the one or more groups with a predetermined skill score; and
provide an alert to a display unit associated with the requirement enhancing system based on the comparison.

10. The requirement enhancing computing device as claimed in claim 9, wherein:
the solidity score of each of the requirements is determined based on at least one of the number of requirements initially approved, the number of the changed requirements, and the predetermined threshold solidity score; or
the weightage score of each of the requirements is computed based on at least one of the number of the requirements and the data on number of defects corresponding to the requirements.

11. The requirement enhancing computing device as claimed in claim 7, wherein the processor is further configured to be capable of executing the stored programmed instructions to:
perform at least one of identifying a deviation of the solidity score with respect to a preconfigured planned solidity score; and
provide an alert to a display unit based on the identification of the deviation.

12. The requirement enhancing computing device as claimed in claim 7, wherein the processor is further configured to be capable of executing the stored programmed instructions to compute at least one of a critical requirements weightage score and a noncritical requirements weightage score, wherein the critical requirements weightage score is computed based on at least one of a number of the critical requirements of the requirements and the data on a number of defects of the corresponding requirements.

13. A non-transitory computer readable medium having stored thereon instructions for enhancing quality of requirements to improve computer application development comprising executable code which when executed by at least one processor, causes the processor to:
  retrieve at least one of expertise data for each of a plurality of users of one or more groups of users involved in identifying one or more requirements of a development of a computer application, domain knowledge of each of the users, a number of defects associated with the requirements, and data of the requirements from one or more source database devices;
  compute a skill score of each of the groups using at least one of the expertise data and the domain knowledge of each of the users of a corresponding one or more of the groups;
  determine a solidity score of each of the requirements using at least one of the data of the requirements and a predetermined threshold solidity score;
  compute a weightage score of each of the requirements based on at least one of the data of the requirements and the data on the number of defects;
  compute a strength score of each of the requirements using at least one of the skill score of each of the groups, the solidity score of each of the requirements, and the weightage score of each of the requirements;
  determine when the strength score for one or more of the requirements exceeds a predetermined threshold strength score; and
  output an alert to a display device when the determining indicates that the strength score for the one or more of the requirements exceeds the predetermined threshold strength score.

14. The non-transitory computer readable medium as claimed in claim 13, wherein the data of the requirements comprises at least one of a number of at least one of major requirements or critical requirements, number of requirements initially approved, number of changed requirements, and number of the requirements.

15. The non-transitory computer readable medium as claimed in claim 13, wherein the executable code when executed by the processor further causes the processor to: perform at least one of comparing the computed skill score of the one or more groups with a predetermined skill score; and provide an alert to a display unit associated with the requirement enhancing system based on the comparison.

16. The non-transitory computer readable medium as claimed in claim 14, wherein:
  the solidity score of each of the requirements is determined based on at least one of the number of requirements initially approved, the number of the changed requirements, and the predetermined threshold solidity score; or
  the weightage score of each of the requirements is computed based on at least one of the number of the requirements and the data on number of defects corresponding to the requirements.

17. The non-transitory computer readable medium as claimed in claim 13, wherein the executable code when executed by the processor further causes the processor to: perform at least one of identifying a deviation of the solidity score with respect to a preconfigured planned solidity score; and provide an alert to a display unit based on the identification of the deviation.

18. The non-transitory computer readable medium as claimed in claim 13, wherein the executable code when executed by the processor further causes the processor to compute at least one of a critical requirements weightage score and a noncritical requirements weightage score, wherein the critical requirements weightage score is computed based on at least one of a number of the critical requirements of the requirements and the data on a number of defects of the corresponding requirements.

* * * * *